United States Patent
Li et al.

(10) Patent No.: US 12,525,662 B2
(45) Date of Patent: Jan. 13, 2026

(54) METHOD FOR RECYCLING AND TREATING ELECTROLYTIC SOLUTION OF LITHIUM ION BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Aixia Li, Guangdong (CN); Xuemei Zhang, Guangdong (CN); Haijun Yu, Guangdong (CN); Yinghao Xie, Guangdong (CN); Changdong Li, Guangdong (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN)

( * ) Notice: Subject to any disclaimer, the term of this patent is extended or adjusted under 35 U.S.C. 154(b) by 207 days.

(21) Appl. No.: 18/288,725

(22) PCT Filed: Sep. 22, 2022

(86) PCT No.: PCT/CN2022/120625
§ 371 (c)(1),
(2) Date: Oct. 27, 2023

(87) PCT Pub. No.: WO2024/036698
PCT Pub. Date: Feb. 22, 2024

(65) Prior Publication Data
US 2025/0079544 A1    Mar. 6, 2025

(30) Foreign Application Priority Data
Aug. 15, 2022 (CN) .......................... 202210975086.4

(51) Int. Cl.
*H01M 10/54* (2006.01)
*B01D 11/02* (2006.01)
(Continued)

(52) U.S. Cl.
CPC ......... *H01M 10/54* (2013.01); *B01D 11/0203* (2013.01); *B01D 15/34* (2013.01);
(Continued)

(58) Field of Classification Search
CPC .............. H01M 10/54; H01M 10/0525; B01D 11/0203; B01D 15/34; B01D 15/363; B09B 3/80; B09B 2101/16; Y02W 30/84
See application file for complete search history.

(56) References Cited

U.S. PATENT DOCUMENTS

| | | | |
|---|---|---|---|
| 5,888,463 A | 3/1999 | McLaughlin et al. | |
| 2002/0020946 A1* | 2/2002 | Hiraoka | B29C 71/0009 429/247 |
| 2022/0231350 A1 | 7/2022 | Lipson | |

FOREIGN PATENT DOCUMENTS

| | | | | |
|---|---|---|---|---|
| CN | 108288738 A | * | 7/2018 | ........ H01M 10/0564 |
| CN | 109037828 A | * | 12/2018 | ............ H01M 10/54 |

(Continued)

OTHER PUBLICATIONS

Delta Adsorbents "What Is a Molecular Sieve: 3A, 4A & 5A." Jan. 21, 2021, deltaadsorbents.com/what-is-a-molecular-sieve-3a-4a-5a/?srsltid=AfmBOooLhDWw_DO9nLK0DIbGYT5A0Yg_1igPyM_eTrSG_TByL77fD3EY. (Year: 2021).*

(Continued)

*Primary Examiner* — Keith D. Hendricks
*Assistant Examiner* — Moriah S. Smoot
(74) *Attorney, Agent, or Firm* — Westbridge IP LLC (57) ABSTRACT

A method for recycling and treating an electrolytic solution of a lithium ion battery includes S1: cooling a fully dis- (Continued)

charged lithium ion battery below a freezing point of the electrolytic solution, and then disassembling and crushing the lithium ion battery to obtain a crushed solid containing the electrolytic solution, S2: under a protection of an inert gas, placing the crushed solid in a supercritical $CO_2$ extraction instrument in which an entrainer is added; S3: conducting extraction; and S4: collection an extraction product with a cryogenic device, and adsorbing water in the extraction product using a 4 Å type lithiated molecular sieve, adsorbing HF in the extraction product using weak-base anion-exchange resin and adsorbing organic acid and alcohol in the extraction product using a 5 Å type lithiated molecular sieve.

3 Claims, 3 Drawing Sheets

(51) Int. Cl.
  *B01D 15/34* (2006.01)
  *B01D 15/36* (2006.01)
  *B09B 3/80* (2022.01)
  *B09B 101/16* (2022.01)

(52) U.S. Cl.
  CPC .............. *B01D 15/363* (2013.01); *B09B 3/80* (2022.01); *B09B 2101/16* (2022.01)

(56) References Cited

FOREIGN PATENT DOCUMENTS

| | | | | |
|---|---|---|---|---|
| CN | 110620276 A | * | 12/2019 | ............. B01D 53/82 |
| GB | 2621712 B | | 4/2025 | |

OTHER PUBLICATIONS

Mu, Deying, et al. "Transcritical CO 2 extraction of electrolytes for lithium-ion batteries: optimization of the recycling process and quality-quantity variation." New Journal of Chemistry 41.15 (2017): 7177-7185. (Year: 2017).*
CN-110620276-A Trans (English Language Translation) (Year: 2019).*
CN 109037828 A Trans (English Language Translation) (Year: 2018).*
CN108288738A Trans (English Language Translation) (Year: 2018).*
Examination report under Section 18 (3) issued by the UK Intellectual Property Office for the UK patent application GB2313100.6 dated Mar. 21, 2024 with the Combined Search and Examination Report under Section 17 and 18 (3) dated Oct. 17, 2023.
Intention to Grant under Section 18 (4) issued by the UK Intellectual Property Office for the UK patent application GB2313100.6, dated Jan. 21, 2025.
Notification of Grant issued by the UK Intellectual Property Office for the UK patent application GB2313100.6 dated Mar. 4, 2025.
International search report with the Written Opinion of the International Searching Authority issued by the China National Intellectual Property Administration for International Patent Application No. PCT/CN2022/120625, mailed on Apr. 27, 2023, with an English translation of the International Search Report and conclusions from the Written Opinion.
Wang Wei, "Research on Recycling and Reusing of Lithium-ion Battery Electrolyte Based on Supercritical CO2 Extraction", Dissertation Extraction, Changzhou University, Jan. 15, 2022, pp. 1-19, China Academic Journal Electronic Publishing House, http://222.cnki.net, with English abstract.
Liu Yuanlong, "Research on Recycling and Reusing of Carbonate Based Electrolyte for Lithium Ion Batteries by Supercritical CO2", Dissertation, Harbin Institute of Technology, Jan. 15, 2018, pp. 1-28, China Academic Journal Electronic Publishing House, http://222.cnki.net, with English abstract.

* cited by examiner

METHOD FOR RECYCLING AND TREATING ELECTROLYTIC SOLUTION OF LITHIUM ION BATTERY

CROSS-REFERENCE TO RELATED APPLICATION

This application is a national stage filing under 35 U.S.C. § 371 of international application number PCT/CN2022/120625, filed Sep. 22, 2022, which claims priority to Chinese patent application No. 202210975086.4, filed Aug. 15, 2022. The contents of these applications are incorporated herein by reference in their entirety.

TECHNICAL FIELD

The present invention belongs to the technical field of recycling and reusing batteries, and more particularly, relates to a method for recycling and treating an electrolytic solution of a lithium ion battery.

BACKGROUND

Waste lithium batteries take on a trend of explosive and cumulative increase, and the cumulative effect of hidden dangers about health, environment and safety thereof is multiply magnified. Recycling and reusing the waste lithium batteries may solve the problems of environmental pollution, and poor safety and the like due to the cumulation of the waste lithium batteries. Particularly, electrolytic solutions in the waste lithium batteries contain toxic and harmful substances which are very prone to effecting side reactions in the natural environment and then causing secondary pollution; and recycling the electrolytic solutions in the waste lithium batteries may effectively improve the problem of secondary pollution.

A method for recycling an electrolytic solution of a lithium ion battery provided in the related art mainly adopts an extraction process with an organic solvent and an extraction process with supercritical $CO_2$. The extraction process with an organic solvent is mainly to soak a crushed battery by introducing a solvent having the solubility similar to that of an electrolytic solution, transfer the electrolytic solution into the solvent and then separate the solvent from the electrolytic solution. The method has the deficiencies of high cost of the solvent, complex separation process for an extraction product, high energy consumption, a residual solvent in the extraction product and the like. Compared with the extraction process with an organic solvent, by extracting the electrolytic solution of the battery with introduction of the supercritical $CO_2$, the problems of a residual solvent and the like may be solved; however, the supercritical $CO_2$ has relatively weak polarity and needs to be improved in intersolubility with the electrolytic solution, the recycling technology of the electrolytic solution is largely difficult, and it is difficult to obtain an electrolytic solution recycled product which can be directly reused.

SUMMARY

An objective of the present invention is to provide a method for recycling and treating an electrolytic solution of a lithium ion battery, through which an electrolytic solution recycled product which can be directly reused can be obtained.

The present invention is implemented as follows:

the present invention provides a method for recycling and treating an electrolytic solution of a lithium ion battery, comprising:
S1: cooling a fully discharged lithium ion battery below the freezing point of the electrolytic solution, and then disassembling and crushing the lithium ion battery to obtain a crushed solid containing the electrolytic solution;
S2: under the protection of an inert gas, placing the crushed solid in a supercritical $CO_2$ extraction instrument in which an entrainer is added;
S3: conducting extraction; and
S4: collecting an extraction product with a cryogenic device, and adsorbing water in the extraction product using a 4 Å type lithiated molecular sieve, adsorbing HF in the extraction product using weak-base anion-exchange resin and adsorbing organic acid and alcohol in the extraction product using a 5 Å type lithiated molecular sieve.

In alternative embodiments, the 4 Å type lithiated molecular sieve is made by lithiating a 4 Å type molecular sieve with a LiCl ethanol solution; and/or
the 5 Å type lithiated molecular sieve is made by lithiating a 5 Å type molecular sieve with a LiCl ethanol solution.

In alternative embodiments, the concentration of the LiCl ethanol solution is 1.8-2.2 mol/L; and the number of lithiation treatments is 5-10 times.

In alternative embodiments, the entrainer comprises cyclic carbonates.

In alternative embodiments, the entrainer further comprises N, N-dimethylformamide.

In alternative embodiments, the mass ratio of the cyclic carbonates to the N, N-dimethylformamide is (3-4):1.

In alternative embodiments, the extraction comprises static extraction and dynamic extraction.

In alternative embodiments, when the dynamic extraction starts, an addition flow rate of the entrainer is 8-10% of the flow rate of $CO_2$.

In alternative embodiments, the time for static extraction is 18-22 min, and the time for dynamic extraction is 35-55 min.

In alternative embodiments, for the extraction, the pressure is 21-35 MPa, and the temperature is 40-55° C.

The present invention has the following beneficial effects that:
In the method for recycling and treating the electrolytic solution of the lithium ion battery provided by the embodiments of the present invention, after extraction with the supercritical $CO_2$, the water in the extraction product is adsorbed using the 4 Å type lithiated molecular sieve, the HF in the extraction product is adsorbed using the weak-base anion-exchange resin, and the organic acid and the alcohol in the extraction product are adsorbed using the 5 Å type lithiated molecular sieve. Therefore, by adsorbing the water, the HF, the organic acid and the alcohol in the extraction product with the 4 Å type lithiated molecular sieve, the weak-base anion-exchange resin and the 5 Å type lithiated molecular sieve, respectively, it is convenient to obtain the electrolytic solution recycled product which can be directly reused.

BRIEF DESCRIPTION OF THE DRAWINGS

In order to more clearly describe the technical solutions of the embodiments of the present invention, the accompanying drawings required to describe the embodiments are briefly described below. It should be understood that the accompanying drawings described below are only to illustrate certain embodiments of the present invention and thus are not to be interpreted as limiting the scope of the present invention. Those skilled in the art may further obtain other relevant accompanying drawings based on these accompanying drawings without inventive effort.

DETAILED DESCRIPTION

In order to make objectives, technical solutions and advantages of the embodiments of the present invention clearer, the technical solutions in the embodiments of the present invention will be described clearly and completely below. If the specific conditions are not indicated in the embodiments, the method is conducted according to the conventional conditions or the conditions recommended by the manufactures. Used reagents or instruments (of which the manufacturers are not indicated) may all be commercially available conventional products.

The present invention provides a method for recycling and treating an electrolytic solution of a lithium ion battery, which may be used for recycling an electrolytic solution of a waste lithium ion battery and comprises:

S1: cooling a fully discharged lithium ion battery below a freezing point of the electrolytic solution, and then disassembling and crushing the lithium ion battery to obtain a crushed solid containing the electrolytic solution;

S2: under the protection of an inert gas, placing the crushed solid in a supercritical $CO_2$ extraction instrument in which an entrainer is added;

S3: conducting extraction; and

S4: collecting an extraction product with a cryogenic device, adsorbing water in the extraction product is with a 4 Å type lithiated molecular sieve, adsorbing HF in the extraction product with a weak-base anion-exchange resin (a weak-base anion-exchange membrane), and adsorbing organic acid and alcohol in the extraction product with a 5 Å type lithiated molecular sieve.

By adsorbing the water, the HF, the organic acid and the alcohol in the extraction product with the 4 Å type lithiated molecular sieve, the weak-base anion-exchange resin and the 5 Å type lithiated molecular sieve, respectively, it is convenient to obtain an electrolytic solution recycled product which can be directly reused.

As the waste lithium ion battery with a remaining charge is subjected to multiple cycles, the probability of internal defects is increased; and in this state, under the conditions or in the environment of a mechanical collision or a special temperature and humidity, as well as poor contact and the like, the waste lithium ion battery may discharge instantaneously to produce a large amount of current, and then is spontaneously combusted or explodes. In order to diminish these hazards and accidents to the maximum, in step S1, it needs to start a subsequent process after the waste lithium ion battery is fully discharged. For example: the waste lithium ion battery may be put in a $MnSO_4$ electrolytic solution with a concentration of 0.8 mol/L and is discharged for 8 h under the conditions of a temperature of 80° C. and a pH value of 2.78; and when the residual voltage drops to 0.54 V, optimal discharge of the lithium battery is reached to meet green and efficient discharge condition. For a lithium ion battery pack of an electric vehicle, due to more residual capacity of the waste lithium ion battery, it is more suitable for using a charge/discharge machine to collect the residual charge, and it is then subjected to a subsequent disassembling or crushing process if the residual voltage is detected to be in a safety range.

In some embodiments, the waste lithium ion battery is disassembled in a liquid nitrogen environment at −200° C., and the effect of safety protection may be fulfilled.

The inventor discovers from researches that, due to limitation in process conditions, equipment requirements and other factors, after the solubility of the supercritical $CO_2$ fluid reaches a certain upper limit, the extraction effect is difficult to be continuously improved by merely changing the process conditions. Therefore, by adding a specific entrainer, the extraction effect is improved and the extraction efficiency is increased in the present invention.

In some embodiments, the entrainer comprises cyclic carbonates, for example: ethylene carbonate, propylene carbonate or butylene carbonate. The cyclic carbonates are common organic solvent for the electrolytic solution and is a solvent with relatively large polarity without worrying about the residual problem; moreover, the cyclic carbonates entrainer further has certain improvement effect on the extraction efficiency of $LiPF_6$ without accelerating decomposition of $LiPF_6$.

Further, the entrainer further comprises N,N-dimethylformamide, that is, in another embodiments, the entrainer is a mixture of the cyclic carbonates and the N,N-dimethylformamide; and the mass ratio of the cyclic carbonates to the N, N-dimethylformamide is (3-4):1, for embodiment 3:1, 4:1 and the like.

The N, N-dimethylformamide is also a common organic solvent for the electrolytic solution and is a solvent with relatively large polarity without worrying about the residual problem. That is, the entrainers in the present invention are all reagents easily separated from an extract. If there is entrainer residue, it needs to add a treating process for separating the entrainer behind extraction after the entrainer is used; and if the entrainer residue in the extract is not removed or is difficult to be removed, the extraction with the supercritical fluid would lose the advantages of cleanness and environmental protection.

Through gas chromatography, the inventor determines that the two entrainers which are the cyclic carbonates and the N, N-dimethylformamide do not destroy the chemical properties of the electrolytic solution. Therefore, the method for recycling the electrolytic solution of the present invention cannot make components of an organic solvent for the electrolytic solution be decomposed or produce new substances and may intactly extract the components from the electrolytic solution.

Cyclic carbonates and N,N-dimethylformamide mixed entrainer is used, wherein the N,N-dimethylformamide entrainer is used for synergetically enhancing the extraction efficiency, and the optimal extraction efficiency is reached if the mass ratio of the two is (3-4):1.

The inventor discovered from researches that the polarity of $CO_2$ is relatively weak, relatively high extraction efficiency of lipophilic substances with relatively weak polarity in the electrolytic solution of the lithium ion battery may be achieved in pure supercritical $CO_2$; and conversely, the extraction efficiency of a compound with relatively strong polarity or a lithium salt in the electrolytic solution is not ideal. Although the extraction efficiency of polar components may be improved by adjusting the pressure and the temperature of the supercritical $CO_2$ in the extraction process, the actual operation is limited by various factors. For this purpose, by using the cyclic carbonates and N, N-dimethylformamide mixed entrainer, the dissolution pressure of the polar solute can be lowered, the solubility of the polar solute is effectively improved, and the extraction efficiency of the polar substance is significantly improved.

In another aspect, in the present invention, due to the fact that the N,N-dimethylformamide entrainer has a polarity greater than that of the cyclic carbonates entrainer and a viscosity lower than that of the cyclic carbonates entrainer, it is more conducive to the diffusion of the two entrainers in an adsorbate of the electrolytic solution, increasing the contact between the two entrainers and the electrolytic solution as well as increasing the dissolution of the electrolytic solution.

It can be seen from the above that by adding the compounded N, N-dimethylformamide entrainer in the cyclic carbonates, under the comprehensive action of multiple factors, with the cooperative use of the two entrainers, the extraction efficiency is enhanced, and the extraction effect is far greater than that of using a single entrainer.

In some embodiments, in step S3, at a pressure of 21-35 MPa (for example, 21 MPa, 25 MPa, 27 MPa, 30 MPa, 35 MPa and the like) and a temperature of 40-55° C. (for example, 40° C., 45° C., 50° C., 55° C. and the like), co-extraction with the supercritical $CO_2$ and the entrainer is conducted for separating an electrolyte out of the electrolytic solution, and an extraction product is obtained.

Further, the extraction comprises static extraction and dynamic extraction. Alternatively, the time for static extraction is 18-22 min, for example, 18 min, 20 min, 22 min and the like; and the time for dynamic extraction is 35-55 min, for example, 35 min, 40 min, 45 min, 50 min, 55 min and the like.

By combining the two methods of static extraction and dynamic extraction, in which static extraction is employed first, and then dynamic extraction is employed after the solute is fully dissolved, residue of the solute in a sample matrix can be reduced, and the extraction efficiency can be improved.

Alternatively, when the extraction starts, an entrainer is added to the supercritical $CO_2$ extraction instrument in advance, wherein an addition usage of the entrainer may be determined according to a corresponding proportion of a solvent in an extraction kettle, such as 10% of the solvent in the kettle. When the dynamic extraction starts, the usage of the entrainer in the supercritical $CO_2$ extraction instrument may keep at 8-10%; that is, an addition flow rate of the entrainer is 8-10% of a flow rate of the $CO_2$, for example, 8%, 9%, 10% and the like.

In some embodiments, the 4 Å type lithiated molecular sieve is made by lithiating a 4 Å type molecular sieve with a LiCl ethanol solution; and the 5 Å type lithiated molecular sieve is made by lithiating a 5 Å type molecular sieve with the LiCl ethanol solution.

Further, a concentration of the LiCl ethanol solution is 1.8-2.2 mol/L, for example, 1.8 mol/L, 2.0 mol/L, 2.2 mol/L and the like; and the number of lithiation treatments is 5-10 times, for example: 5 times, 6 times, 7 times, 8 times, 9 times and 10 times.

It should be noted that after the 4 Å type molecular sieve and the 5 Å type molecular sieve are soaked with the LiCl ethanol solution for about 36 h, vacuum drying is conducted, this step is repeated for 5-10 times, and then the 4 Å type lithiated molecular sieve and the 5 Å type lithiated molecular sieve may be obtained.

The present invention will be further described below in detail in combination with the examples.

Embodiment 1

S1: A waste lithium ion battery was fully discharged, then cooled below a freezing point of the electrolytic solution, and then dissembled and crushed to obtain a crushed solid containing the electrolytic solution.

S2: Cyclic carbonates entrainer was added to a supercritical $CO_2$ extraction instrument; and under the protection of an inert gas, the crushed solid in step S1 was placed in the supercritical $CO_2$ extraction instrument.

S3: At a pressure of 21 MPa and a temperature of 40° C., co-extraction was conducted with the supercritical $CO_2$ and the entrainer for separating the electrolyte out of the electrolytic solution, and an extraction product was obtained, wherein an extraction time was as follows: the time for static extraction was 20 min, and then the time for dynamic extraction was 55 min.

Wherein, when the dynamic extraction started, a usage of the cyclic carbonates entrainer in the supercritical $CO_2$ extraction instrument was kept at 8%, and the addition flow rate of the cyclic carbonates entrainer was 8% of the flow rate of the $CO_2$.

S4: An extraction product in step S3 was collected with a cryogenic device, water in the extraction product was adsorbed with a 4 Å type lithiated molecular sieve, HF in the extraction product was adsorbed with weak-base anion-exchange resin, organic acid and alcohol in the extraction product were adsorbed with a 5 Å type lithiated molecular sieve, then an electrolytic solution recycled product which may be reused was prepared.

Embodiment 2

S1: A waste lithium ion battery was fully discharged, then cooled below a freezing point of the electrolytic solution, and then dissembled and crushed to obtain a crushed solid containing the electrolytic solution.

S2: Cyclic carbonates-N, N-dimethylformamide mixed entrainer was added to a supercritical $CO_2$ extraction instrument, wherein the mass ratio of cyclic carbonates to N, N-dimethylformamide was 4:1. Under the protection of an inert gas, the crushed solid in step S1 was placed in the supercritical $CO_2$ extraction instrument.

S3: At a pressure of 21 MPa and a temperature of 40° C., coextraction was conducted with the supercritical $CO_2$ and the entrainer for separating an electrolyte out of the electrolytic solution, and an extraction product was obtained, wherein an extraction time was as follows: the time for static extraction was 20 min, and then the time for dynamic extraction was 55 min.

Wherein, when the dynamic extraction started, a usage of the mixture of the two entrainers in the supercritical $CO_2$ extraction instrument was kept at 8%, and an addition flow rate of the mixture of the two entrainers was 8% of the flow rate of the $CO_2$.

S4: An extraction product in step S3 was collected with a cryogenic device, water in the extraction product was adsorbed with a 4 Å type lithiated molecular sieve, HF in the extraction product was adsorbed with weak-base anion-exchange resin, organic acid and alcohol in the extraction product were adsorbed with a 5 Å type lithiated molecular sieve, and an electrolytic solution recycled product which can be reused was prepared.

Embodiment 3

S1: A waste lithium ion battery was fully discharged, then cooled below a freezing point of the electrolytic solution, and then dissembled and crushed to obtain a crushed solid containing the electrolytic solution.

S2: Cyclic carbonates and N, N-dimethylformamide mixed entrainer was added to a supercritical $CO_2$ extraction instrument, wherein the mass ratio of cyclic carbonates to N, N-dimethylformamide was 4:1. Under the protection of an inert gas, the crushed solid in step S1 was placed in the supercritical $CO_2$ extraction instrument.

S3: At a pressure of 35 MPa and a temperature of 55° C., co-extraction was conducted with the supercritical $CO_2$ and the entrainer for separating an electrolyte out of the electrolytic solution, and an extraction product was obtained. Wherein the extraction time was as follows: the time for static extraction was 20 min, and then the time for dynamic extraction was 35 min.

Wherein when the dynamic extraction started, a usage of a mixture of the two entrainers in the supercritical $CO_2$ extraction instrument was kept at 8%; and the addition flow rate of the mixture of the two entrainers was 8% of a flow rate of the $CO_2$.

S4: An extraction product in step S3 was collected with a cryogenic device, water in the extraction product was adsorbed with a 4 Å type lithiated molecular sieve, HF in the extraction product was adsorbed with weak-base anion-exchange resin, organic acid and alcohol in the extraction product were adsorbed with a 5 Å type lithiated molecular sieve, and an electrolytic solution recycled product which can be reused was prepared.

Comparative Example 1

Compared with Embodiment 1, in Comparative Example 1, in step S2, no entrainer was added, and other processes all made reference to Embodiment 1.

Comparative Example 2

Compared with Embodiment 2, in Comparative Example 2, in step S2, the mass ratio of the cyclic carbonates to the N, N-dimethylformamide was 1:1, and other processes all made reference to Embodiment 2.

Comparative Example 3

Compared with Embodiment 2, in Comparative Example 3, when the dynamic extraction started, the addition flow rate of the mixture of the two entrainers was 4% of the flow rate of $CO_2$, and other processes all made reference to Embodiment 2.

Comparative Example 4

Compared with Embodiment 2, in Comparative Example 4, when the dynamic extraction started, the addition flow rate of the mixture of the two entrainers was 6% of the flow rate of $CO_2$, and other processes all made reference to Embodiment 2.

Comparative Example 5

Compared with Embodiment 2, in Comparative Example 5, in step S2, acetone was selected as the entrainer, and other processes all made reference to Embodiment 2.

Comparative Example 6

Compared with Embodiment 2, in Comparative Example 6, in step S4, the extraction products in step S3 were adsorbed with the 4 Å type molecular sieve and the 5 Å type molecular sieve, respectively, and other processes all made reference to Embodiment 2.

1. A comparative experiment was conducted based on Embodiment 1 and Comparative Example 1, under the optimized process conditions (with the pressure of 21 MPa, the temperature of 40° C. and the extraction time for static extraction of 20 min and for dynamic extraction of 55 min) and the extraction condition with the addition amount of the entrainer being 0-8%, a curve graph showing the relationship between no addition of an entrainer and cyclic carbonates entrainer and the extraction efficiency of an electrolytic solution was shown in FIG. 1.

Figure 1:
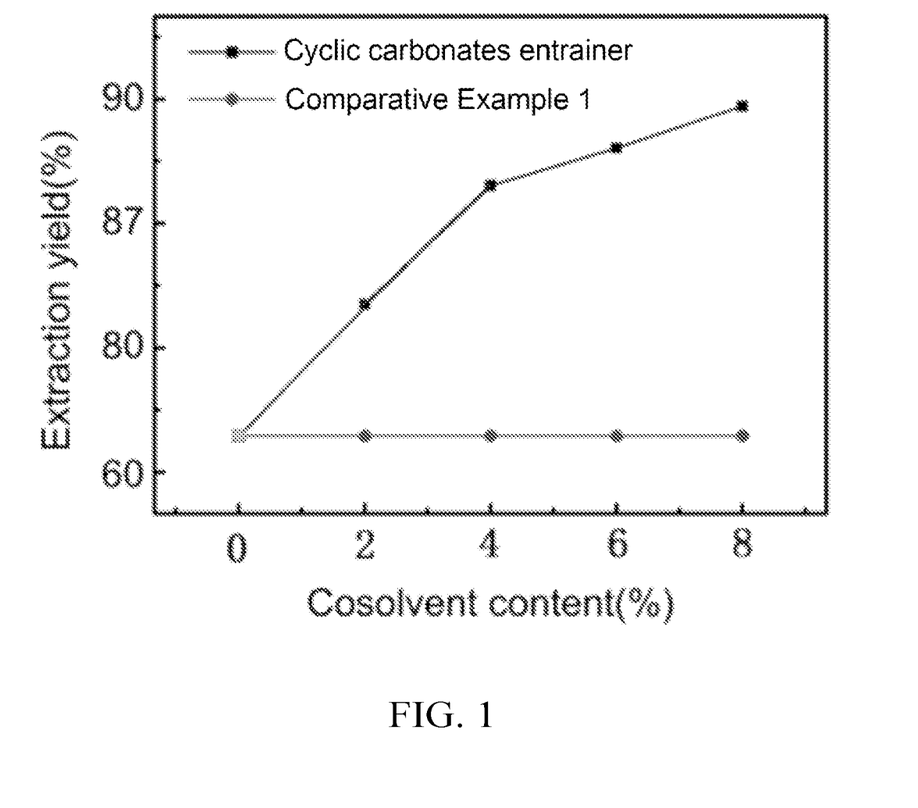
FIG. 1 is a curve graph showing the relationship between cyclic carbonates entrainer and no addition of an entrainer and the extraction efficiency of an electrolytic solution in the present invention.

It can be seen from FIG. 1 that there is an apparent difference in extraction efficiency between the conditions of no addition of entrainer and addition of the cyclic carbonates entrainer; and the extraction efficiency of the electrolytic solution without adding the entrainer (i.e. the addition amount of the entrainer is 0%) is only 66.05%. In a variation range of the usage of the cyclic carbonates entrainer of 0-8%, with the increase in the usage of the entrainer, the extraction efficiency of the electrolytic solution is also improved. If the usage of the entrainer reaches 8% (Embodiment 1), the extraction efficiency of the electrolytic solution with use of the cyclic carbonates entrainer is 88.87%.

2. A comparative experiment was conducted based on Embodiment 2 and Comparative Example 2, under the optimized process conditions (with the pressure of 21 MPa, the temperature of 40° C. and the extraction time for static extraction of 20 min and then for dynamic extraction of 55 min and usage of the entrainer of 8%) and the extraction condition with the addition amount of the entrainer being 0-8%, a curve graph showing the relationship between different mass ratios of a mixed entrainer and the extraction efficiency of an electrolytic solution was shown in FIG. 2.

Figure 2:
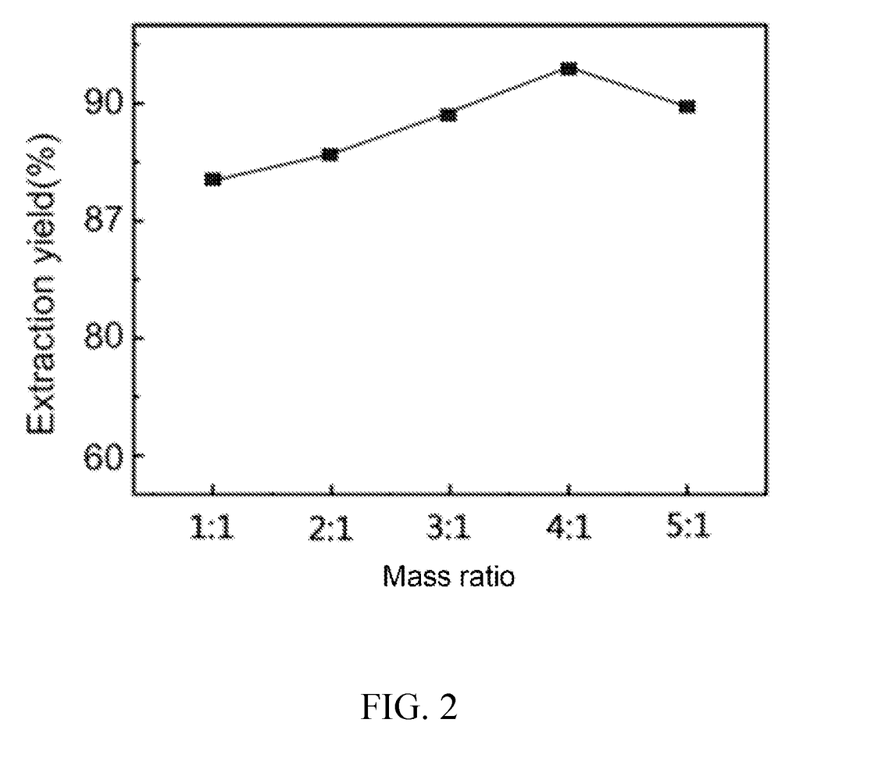
FIG. 2 is a curve graph showing the relationship between different mass ratios of cyclic carbonates and N,N-dimethylformamide mixed entrainer and the extraction efficiency of an electrolytic solution in the present invention.

It can be seen from FIG. 2 that with the reduction in proportion of the N, N-dimethylformamide entrainer in the mass ratio of the cyclic carbonates to the N,N-dimethylformamide, the extraction efficiency of the electrolytic solution is improved. If the mass ratio of the cyclic carbonates to the N, N-dimethylformamide reaches 4:1 (Embodiment 2), the extraction efficiency of the electrolytic solution is 96.24%, respectively. Therefore, the optimal usage at the mass ratio of 4:1 is selected.

3. A comparative experiment as conducted based on Embodiment 2 and Comparative Examples 3, 4 and 5, under the optimized process conditions (with the pressure of 21 MPa, the temperature of 40° C., the extraction time for static extraction of 20 min and then for the dynamic extraction of 55 min and the mass ratio of the cyclic carbonates to the N, N-dimethylformamide of 4:1), a curve graph showing the relationship between different kinds of entrainers and a usage amount of the entrainer and the extraction efficiency of an electrolytic solution is shown in FIG. 3.

Figure 3:
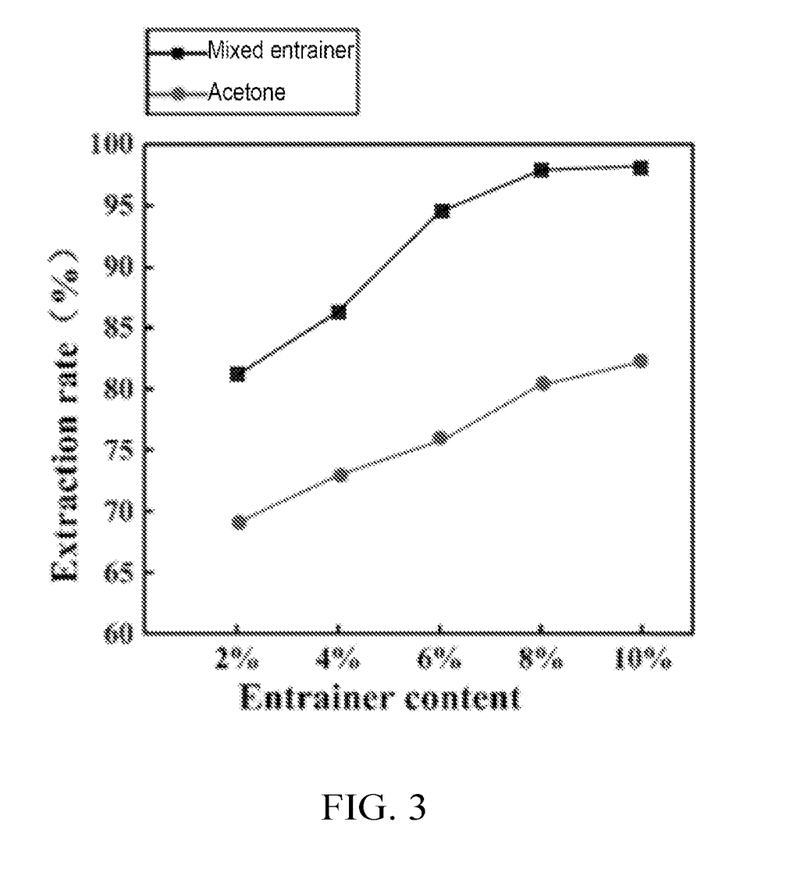
FIG. 3 is a curve graph showing the relationship between different kinds of entrainers and a usage amount of the entrainer and the extraction efficiency of an electrolytic solution in the present invention.

It can be seen from FIG. 3 that with the increase in usage of the cyclic carbonates and N, N-dimethylformamide mixed entrainer, the extraction efficiency of the electrolytic solution is also improved, and the extraction efficiency is 96.24% when the usage of the cyclic carbonates and N, N-dimethylformamide mixed entrainer is 8% (Embodiment 2). Then, the increasing speed of the extraction efficiency of the electrolytic solution becomes gentle gradually, and thus 8% is selected as the optimal usage of the entrainer.

Moreover, the extraction efficiency of the electrolytic solution by using the cyclic carbonates and N, N-dimethylformamide mixed entrainer of the present invention is far greater than that by using acetone.

4. From the descriptions in the above Embodiments, the difference between Embodiment 1 and Embodiment 2 lies in that: the entrainer in Embodiment 1 only comprises the cyclic carbonates, while the entrainer in Embodiment 2 is the mixture of the cyclic carbonates and the N, N-dimethylformamide; and it can be seen from FIG. 1 and FIG. 3 that the extraction efficiency of the electrolytic solution in Embodiment 1 is 88.87%, and the extraction efficiency of the electrolytic solution in Embodiment 2 is 96.24% respectively. Therefore, it can be seen from the above that the cooperation of the cyclic carbonates and the N, N-dimethylformamide has apparently improved the extraction efficiency of the electrolytic solution.

5. In the electrolytic solution recycled by the supercritical $CO_2$, there is a relatively large content of HF due to the decomposition of a fluorine-containing lithium salt, and the removal of HF is also an important link of reusing the electrolytic solution. As the influencing factor of water (for example, water in $CO_2$, an extraction kettle and a pipeline in extraction equipment) in the process of extraction with the supercritical $CO_2$ cannot be thoroughly excluded, a certain amount of water may be introduced into the extraction process of the electrolytic solution. Although a certain amount of water may be consumed in the hydrolysis process of the lithium salt in the electrolytic solution, the water content may still be too high.

In Embodiment 1, the water and the HF in the electrolytic solution recycled product of the waste lithium ion battery are removed by using the 4 Å type lithiated molecular sieve, the 5 Å type lithiated molecular sieve and the weak-base anion-exchange resin, wherein the water content may be lowered to 20 ppm or below, and the HF content may be lowered to 50 ppm or below. Following a formulation of a commercial electrolytic solution, components are supplemented for the electrolytic solution recycled in Embodiment 1 to synthesize a reused electrolytic solution, and the physical and chemical properties of the reused electrolytic solution are characterized, the results show that the HF content, the water content, the ionic conductivity, a transference number of lithium ions, an electrochemical window and the like in the reused 20) electrolytic solution meet the relative index requirements.

However, in Comparative Example 6, too high HF content in the electrolytic solution may cause corrosion inside the battery, which results in the problems that an internal resistance of the battery is increased to cause problems such as degradation in specific capacity and coulombic efficiency of the battery and the like.

To sum up, in the method for recycling and treating the electrolytic solution of the lithium ion battery of the present invention, parameters of the process of extracting the electrolytic solution with the supercritical $CO_2$ are optimized; at a specific pressure and system temperature, the polarity of $CO_2$ is controlled to improve the extraction efficiency of the electrolytic solution, so that physical properties of a density, the polarity and the like of the $CO_2$ are controlled through the pressure and the temperature, and then the $CO_2$ is more selective for a solute. The present invention further combines static extraction with dynamic extraction; during the static extraction, the solute is conveniently fully dissolved, then dynamic extraction is conducted to reduce the residual of the solute in a matrix, and then the extraction efficiency is improved; while the extraction time is short, so as to reduce losses of volatile components and easily decomposed components; and with addition of the cyclic carbonates entrainer, the extraction efficiency of the components is improved. Therefore, the present invention can consider all extraction rules of most main components and guarantee relatively high recycling efficiency of various components in the extraction product.

At the specific system temperature and pressure of the present invention, cyclic carbonates entrainer is added to the supercritical $CO_2$, and a density of a fluid is increased, resulting in increase in solubility of the electrolytic solution. In another aspect, under the specific process parameters, by combining with the N, N-dimethylformamide entrainer, the cooperation of the cyclic carbonates and the N, N-dimethylformamide has apparently improved extraction efficiency of the electrolytic solution without decomposing or producing a new substance from, an organic solvent component in the electrolytic solution, and thus the extraction efficiency of the electrolytic solution is significantly improved.

What stated above are merely preferred embodiments of the present invention but are not intended to limit the present invention, and various modifications and variations can be made to the present invention for those skilled in the art. Any modifications, equivalent substitutions, improvements and the like within the spirit and the principle of the present invention are intended to fall within the protection scope of the present invention.

The invention claimed is:

1. A method for recycling and treating an electrolytic solution of a lithium ion battery, comprising:
    S1: cooling a fully discharged lithium ion battery below a freezing point of the electrolytic solution, and then disassembling and crushing the lithium ion battery to obtain a crushed solid containing the electrolytic solution;
    S2: under a protection of an inert gas, placing the crushed solid in a supercritical $CO_2$ extraction instrument in which an entrainer is added;
    S3: conducting co-extraction with a supercritical $CO_2$ and the entrainer; and
    S4: collecting an extraction product which comprises water, hydrofluoric acid (HF), organic acid and alcohol with a cryogenic device, and adsorbing water in the extraction product using a 4 Å type lithiated molecular sieve, adsorbing HF in the extraction product using weak-base anion-exchange resin and adsorbing organic acid and alcohol in the extraction product using a 5 Å type lithiated molecular sieve;
    wherein the extraction comprises static extraction and dynamic extraction;
    the entrainer is a cyclic carbonate entrainer, and when the dynamic extraction starts, the addition flow rate of the cyclic carbonate entrainer is 8% of a flow rate of the supercritical $CO_2$; or the entrainer is a cyclic carbonate-N,N-dimethylformamide mixed entrainer, wherein the mass ratio of cyclic carbonate to N,N-dimethylformamide is 4:1, and when the dynamic extraction starts, the addition flow rate of the cyclic carbonate-N,N-dimethylformamide mixed entrainer is 8% of the flow rate of the supercritical $CO_2$; and the 4 Å type lithiated molecular sieve is made by lithiating a 4 Å type molecular sieve with a LiCl ethanol solution, wherein a concentration of the LiCl ethanol solution is 1.8-2.2 mol/L; and a number of lithiation treatments is 5-10 times; and/or, the 5 Å type lithiated molecular sieve is made by lithiating a 5 Å type molecular sieve with a LiCl ethanol solution, wherein a concentration of the LiCl ethanol solution is 1.8-2.2 mol/L; and a number of lithiation treatments is 5-10 times.

2. The method for recycling and treating the electrolytic solution of the lithium ion battery according to claim 1, wherein time for the static extraction is 18-22 min, and time for the dynamic extraction is 35-55 min.

3. The method for recycling and treating the electrolytic solution of the lithium ion battery according to claim 1, wherein for the extraction, a pressure is 21-35 MPa, and a temperature is 40-55° C.

\* \* \* \* \*